(No Model.) 2 Sheets—Sheet 1.
F. S. WILLOUGHBY & T. HORSFIELD.
CARRIAGE WHEEL TIRE.
No. 467,112. Patented Jan. 12, 1892.
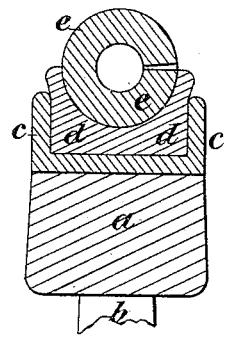
FIG. 1.
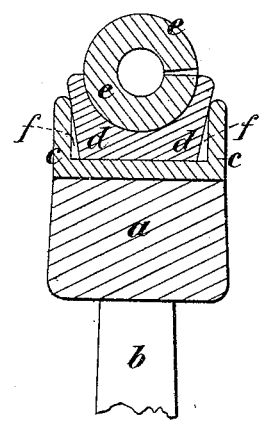
FIG. 2.
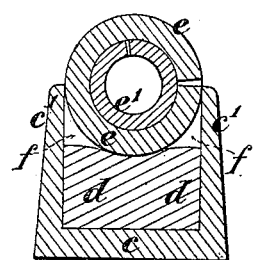
FIG. 3.
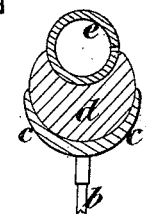
FIG. 6.
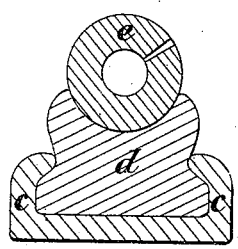
FIG. 1a.
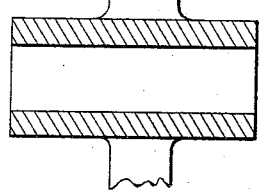
FIG. 7.
FIG. 8.
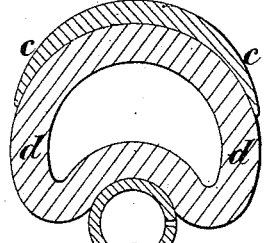
FIG. 4.
FIG. 5.
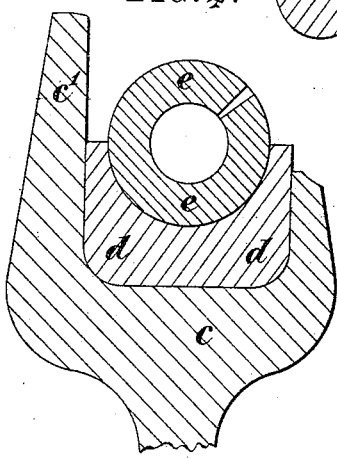
FIG. 9.
FIG. 10.
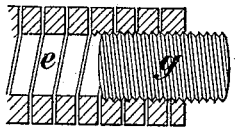
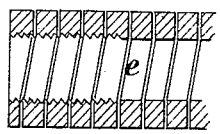
Witnesses.
John Revell
George Baumann
Inventors.
Frank Stanley Willoughby
Thomas Horsfield
By their Attorneys Howson and Howson (No Model.) 2 Sheets—Sheet 2.
F. S. WILLOUGHBY & T. HORSFIELD.
CARRIAGE WHEEL TIRE.
No. 467,112. Patented Jan. 12, 1892.
FIG: 11.
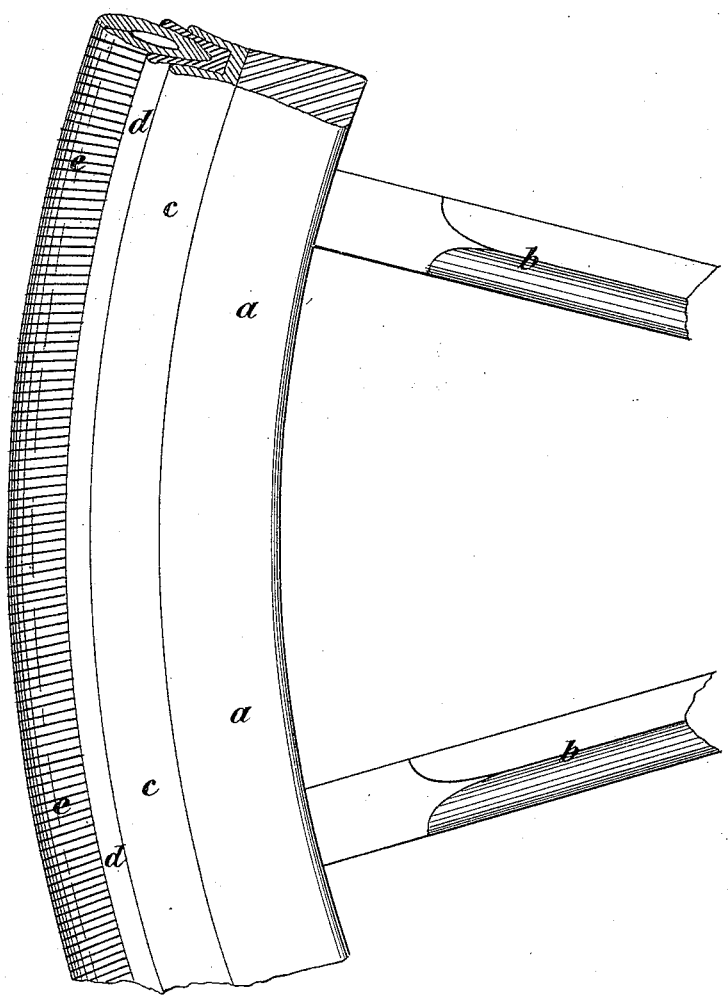

UNITED STATES PATENT OFFICE.

FRANK STANLEY WILLOUGHBY AND THOMAS HORSFIELD, OF MANCHESTER, ENGLAND.

CARRIAGE-WHEEL TIRE.

SPECIFICATION forming part of Letters Patent No. 467,112, dated January 12, 1892.

Application filed January 26, 1891. Serial No. 379,021. (No model.) Patented in England March 15, 1890, No. 4,064.

*To all whom it may concern:*

Be it known that we, FRANK STANLEY WILLOUGHBY and THOMAS HORSFIELD, subjects of the Queen of Great Britain and Ireland, and both residing at Manchester, in the county of Lancaster, England, have invented Improvements in the Tires of Carriage and Velocipede Wheels, (for which we have obtained a patent in Great Britain, No. 4,064, bearing date March 15, 1890,) of which the following is a specification.

Our invention consists of the application of a flexible metal armor to india-rubber-tired vehicle-wheels, whereby advantages obtained by the use of india-rubber or other similar tires are retained without the excessive wear and tear on the rubber or other comparatively soft or yielding material and consequent short life of the same by reason of its contact with the road or rolling way.

The nature of our said invention and the manner in which the same is to be performed or carried into practical effect will be readily understood on reference to the two sheets of illustrative drawings hereunto annexed and the following explanation thereof.

It consists in the application to or combination with any wheel tired with india-rubber or other yielding material or compound (preferably with a rubber tire of a special suitable section hereinafter described) of a flexible metal armor, which is in reality an extra tire laid over, firmly secured to, or partly embedded in the rubber tire on the outside periphery as an armor. If this flexible metal armor be embedded in the rubber, sufficient of it must be left protruding beyond the rubber to prevent the latter from generally coming into contact with the road or other surface.

In the accompanying drawings, Figure 1 is a cross-section of the wooden felly and compound metal and rubber tire of an ordinary road-vehicle, showing the application of our extra metal tire or armor-coil thereto. Fig. 1ᵃ is a section showing the same applied to a different form of noiseless tire. Fig. 2 shows a modification having spaces left between the metal tire and the rubber tire to allow of displacement of the latter under pressure. Fig. 3 is a section of a metal wheel for ordinary road with grooved felly and india-rubber tire fitted with a double-armor coil according to our invention. Fig. 4 is a section showing the application of the same to a tram-car wheel. Fig. 5 is a section showing the application of three armor-coils side by side for traction-engine wheels of extra width; Fig. 6, a section of an ordinary india-rubber-tired cycle-wheel with our armor-coil applied, and Fig. 7 a similar view of the same applied to a pneumatic tire. Fig. 8 is a section illustrating the methods of making an oblong form of coil round a divided mandrel. Fig. 9 is a section showing our method of joining the two ends of a coil, and Fig. 10 shows two sections of a taper form of rod such as we prefer to use coiled with the narrow side to the mandrel in making our improved armor-coil or extra tire. Fig. 11 shows a side elevation of part of a wooden wheel with compound iron and rubber noiseless tire fitted with our extra tire or armor-coil, as at Figs. 1 and 2.

Referring to Fig. 1 on the drawings, $a$ is the usual wooden rim, $b$ part of one of the ordinary spokes, and $c$ is a metal tire of a trough-shaped section. $d$ is an india-rubber or other similar tire formed with an external semicircular groove, and $e$ is our flexible armor. Fig. 1ᵃ shows the same applied to the rubber tire when set in a trough of undercut section.

This armour is of a special construction, and is made from steel or other suitable metal in the form of a close coil, which we hoop, as hereinafter described. This coil may be made of metal of any section, but with a substantially flat outer face, Figs. 9 and 10, so that the wearing-face of the coiled tire will be smooth and practically continuous, Fig. 11. The natural section of the metal is therefore quadrilateral; but the coil is preferably of metal of flat or oblong section, coiled on edge, (see Fig. 10,) which makes a coil of great lateral flexibility coupled with great compressible rigidity.

In the drawings referred to in this specification we have shown the flexible armor to be of round section. We do not, however, confine ourselves to this section of armor, which we may make of any section. For instance, for the application to a vehicle-wheel of wide tread we sometimes form the armor-coil $e$ on an oblong mandrel $e^x$, (with the sharp corners preferably rounded off, and preferably made in sections to facilitate withdrawal from the coil,) as shown in Fig. 8, thus forming an oblong armor-coil which we put round the wheel; or we may make the armor-coil of round section, and then either by rolling or hammering flatten it into an oval or oblong shape. An armor of this section may be put on traction-engine wheels in lieu of two or more smaller round armor-coils, as hereinafter described.

We sometimes form our flexible armor of two layers of metal (see Fig. 3)—that is to say, really two flexible armor-coils $e$ $e'$, one wound tightly on the other for the purpose of obtaining greater elongating rigidity, and it is better to form the inner one of flat metal coiled on its side, which forms an almost unstretchable armor-coil, while the outer one is formed of flat or oblong metal coiled on edge. This forms an armor-coil of great compressible rigidity, and the two together form one flexible armor which will not materially stretch, and which will not flatten, but which is flexible and is peculiarly suitable for wheels of very large circumference.

Although we do not confine ourselves to any particular method of uniting the ends of the armor-coils to form the same into hoops, the following is one way in which it may be effectually accomplished.

We form an ordinary screw-thread in the bore of both ends of the armor-coil. (See Fig. 9.) We screw-thread a short length of metal $g$ about half an inch to one inch long over its entire length, such screw-thread being similar in size and pitch to the screw-thread in the bore of the armor-coil. We screw the whole of this short length of metal into one end of the armor-coil, except so much of it as contains from one to, say, six threads, which short length we leave jutting out from the armor-coil. In "tapping" this end of the armor-coil we have done it only so far down that the short length of metal is locked tightly into it, when from one to six threads are left protruding, and the short length of metal cannot therefore entirely disappear within the internal bore of the armor-coil. This done, we firmly secure the end of the armor-coil into which the short length of metal has been screwed in a vise or other convenient holder to prevent it turning. We then take hold of the other end of the armor-coil and by gripping it tightly or by clamping a convenient rod upon it to serve as a lever we give it at least as many turns, but preferably one or two more, as we have left threads on the short length of metal protruding from the other end of the armor-coil. This twisting is done in spite of the resistance of the armor-coil, which has a powerful tendency to return to its normal position. Then by bringing the threaded bore of the armor-coil up to the short protruding length of metal and allowing the armor to return to its normal or untwisted position it screws itself upon the short protruding length of metal and the two ends of the armor-coil are brought tightly together and it is formed into a hoop with a scarcely-perceptible joint. We prefer this method of joining to any other.

In order to protect the armor-coil when made from iron or steel from rust, more particularly internally and between its rings, we sometimes deposit copper or other non-rusting metal upon it, or we dip it in hot tar or paint it, and to prevent the bore of the armor-coil from filling up with dirt we sometimes line it with a piece of india-rubber tubing.

The armor-coil is made of a size to suit the wheel to which it is to be applied, and in the case where it is to depend for its fastening to the rubber upon being partly embedded therein it is made slightly smaller in circumference when hooped than the rim, and sprung into the groove in the rubber, as shown at Fig. 1, and its tension, due to its slightly-stretched condition, will generally be found quite sufficient to keep it in place. Cement may be used when thought necessary, or the process known as "vulcanizing" may be adopted.

By the use of this armor-coil the rubber is protected from a large amount of wear and tear and its life is considerably prolonged. The armor also to a great extent, if not entirely, gets rid of that objectionable property usual with naked rubber-tired wheels known as "riding up a hill," which causes a considerable retarding influence to the forward motion of the wheel.

In cases where extra elasticity is required we sometimes make the india-rubber or other yielding material $d$ of a different form from that of the metal rim $c$, leaving a space $f$ between the two to allow of the lateral expansion of the india-rubber under pressure, as shown at Fig. 2.

Fig. 3 is a section suitable for car or truck wheels made entirely of metal, wherein the armor-coil $e$ is not embedded in the india-rubber $d$, but is laid on and kept in place laterally by the upper part of the flanges $c'$ of the rim, which are made deeper for that purpose; and Fig. 4 is a section showing the application of our invention to a flanged wheel for tramway-cars.

Fig. 5 is a section showing the application of the invention to a traction-engine wheel, where a large tread is required, two or three or more steel armor-coils being laid side by side in a wide trough-shaped rim; but, as before stated, a single flat or oblong section armor-coil may be used for this purpose.

Fig. 6 is a section showing the application of our armor to an ordinary bicycle or tricycle wheel, and Fig. 7 is a section illustrating its application to a pneumatic bicycle or tricycle tire in the position it would assume at the point of contact with the ground while supporting the weight of the rider.

We have stated in this specification that, although we may use metal of any section from which to form our armor-coils, we prefer metal of flat or oblong section, and we coil it on edge. There are cases in the practical application of our invention where the armor is required to stand an enormous pressure, and it must always do this without any danger of being flattened, say, for instance, where our armor is applied to the rubber tire of a heavy omnibus. In this case we form our armor-coil from metal of very pronounced oblong or flat section, and we coil it upon an exceedingly small mandrel and so form an almost solid armor-coil. It has been found, however, that when nearly-solid coils are made from ordinary oblong or flat metal there appears a gap between the rings of the coil, owing to the compression and burring-up of the metal on the inner edge and slight elongating and consequent thinning of the metal on the outer edge. To obviate this in any nearly-solid armor-coil, we, while preserving the rectangular oblong or flat section of the metal generally, prefer to have it drawn or rolled very slightly taper (see Fig. 10) and when coiling place the smaller end of the taper next to the mandrel. In this way we are enabled to form an armor-coil, though nearly solid, without the gaps between the coils previously referred to.

An armor-coil formed as just described is similar to a flexible shaft used for the purpose of transmitting power in varying directions.

We are aware that an attempt has been made to tire a wheel with a springy metallic tire, in lieu of india-rubber, or similar substance, by placing round the wheel, in the channel-rim usually holding the rubber, a spiral spring or coil made from very slender steel wire or rod. In this case the spiral spring or coil is of such slender construction and of such fine and even temper that it is resilient and easily compressible, and capable, therefore, of temporarily yielding to inequalities in the road or rolling way, resuming, owing to its resiliency, its normal shape when such inequalities are passed, much in the same way that the rubber did which it displaced. We wish it to be distinctly understood that our armor-coil is nothing of this kind. In no case is our armor-coil springy or resilient, and we wish it to be clearly understood that we do not in any case seek to obtain any compressible elasticity or resilience whatever from it. On the contrary, we in every case make our armor-coil of such stout material as to preclude the possibility of any resilience whatever, and in the majority of cases we prefer to form our armor-coil of metal of pronounced oblong section coiled on edge, with the object of getting it compressibly rigid. In no instance do we seek to dispense with an india-rubber tire, as were it not for the thick tire of rubber over which our armor is laid as a protection there would be no spring or elasticity in the wheel at all. The reason why we make our armor in a coiled form is that by so doing we distribute the fiber or grain of the metal in a spiral direction, and so in every instance obtain some degree of flexibility about the circumference. (Such flexibility being more or less, according to the section of metal from which the armor-coils are made.) We get this flexibility about the circumference in addition to a considerable thickness of metallic wearing-surface. In practical working on a road or rolling way our armor-coil operates exactly as would a very thin steel band laid over a rubber tire, so long as such thin steel band lasted, though it will be readily understood that there would be no thickness of wearing-surface in such steel band, and if it were thin enough to be flexible about the circumference, like our coiled armor, it would quickly wear through or break. On the other hand, if such band were thick enough to stand prolonged wear and tear it will be readily understood that it would be practically a rigid hoop outside a rubber tire with really no flexibility about the circumference. These remarks will make the peculiar advantages and some of the objects of our armor-coil readily understood.

We claim as our invention—

1. The combination, with a wheel tired with india-rubber or similar material, of an additional incompressible but flexible metallic tire consisting of a coil of metal of a section having a substantially flat outer face, as and for the purpose set forth.

2. The combination, with a wheel tired with rubber or similar material, of an additional incompressible but flexible metallic tire consisting of a coil of metal of a quadrilateral section, as and for the purpose described.

3. The combination, with a wheel tired with rubber or similar material, of an additional incompressible but flexible metallic tire consisting of a coil of metal of a flat or oblong section coiled on edge.

4. The combination, with a wheel tired with rubber or similar material, of an additional incompressible but flexible metallic tire consisting of a coil of metal of an oblong but tapering section coiled on edge, with the smaller edge inward.

5. The combination, with a wheel tired with rubber or similar material, of an additional but flexible metallic tire consisting of a coil of metal of flat or oblong section coiled on edge and a second coil within the first.

6. The combination of a metallic tire for wheels, consisting of a coil of metal of quadrilateral section, having the bore of the coil threaded for a short distance at each end, with a threaded plug adapted to be screwed into one end of the bore of the coil and to have the other end of the coil screw itself onto the threaded plug by twisting the coil, all substantially as described.

In testimony whereof we have signed our names to this specification in the presence of two subscribing witnesses.

FRANK STANLEY WILLOUGHBY.
   THOS. HORSFIELD.

Witnesses:
 JNO. HUGHES,
*4 St. Ann Sq., Manchester.*
 J. B. PONTERFRAT,
*Accountant's Clerk, 60 King St., Manchester.*